(12) United States Patent
Duan et al.

(10) Patent No.: US 10,892,691 B2
(45) Date of Patent: Jan. 12, 2021

(54) CONTROL CIRCUIT AND POWER TOOL

(71) Applicant: Nanjing Chervon Industry Co., Ltd., Nanjing (CN)

(72) Inventors: Junya Duan, Nanjing (CN); Shilei Sun, Nanjing (CN); Zhibin Xie, Nanjing (CN); Yang Yang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 16/533,079

(22) Filed: Aug. 6, 2019

(65) Prior Publication Data

US 2019/0363649 A1    Nov. 28, 2019

(30) Foreign Application Priority Data

Feb. 24, 2017   (CN) .......................... 2017 1 0102200
Dec. 21, 2017   (CN) .......................... 2017 1 1391174

(51) Int. Cl.
| | |
|---|---|
| *H02P 1/00* | (2006.01) |
| *H02P 3/00* | (2006.01) |
| *H02P 5/00* | (2016.01) |
| *H02P 3/06* | (2006.01) |
| *H02K 11/30* | (2016.01) |

(52) U.S. Cl.
CPC ................ *H02P 3/06* (2013.01); *H02K 11/30* (2016.01)

(58) Field of Classification Search
CPC .................................. H02P 3/06; H02K 11/30
USPC ......................................................... 318/139
See application file for complete search history.

(56) References Cited

U.S. PATENT DOCUMENTS

| | | | |
|---|---|---|---|
| 5,294,874 A | 3/1994 | Hessenberger et al. | |
| 5,828,194 A * | 10/1998 | Canova ..................... | H02P 3/08 318/290 |
| 6,094,025 A * | 7/2000 | Rosa ......................... | H02P 3/12 318/245 |
| 6,236,177 B1 * | 5/2001 | Zick ..................... | B23D 59/001 318/362 |

(Continued)

FOREIGN PATENT DOCUMENTS

| | | |
|---|---|---|
| CN | 201162107 Y | 12/2008 |
| CN | 101615878 A | 12/2009 |

(Continued)

OTHER PUBLICATIONS

ISA/CN, International Search Report issued on PCT application No. CN20181076730, dated Apr. 27, 2018, 2 pages.

*Primary Examiner* — Erick D Glass
(74) *Attorney, Agent, or Firm* — Greenberg Traurig, LLP

(57) ABSTRACT

A control circuit for a motor has a driving state and a braking state and includes a driving branch and a braking branch. The driving branch includes a branch formed by a stator winding and a rotor. The braking branch includes a branch formed by the stator winding, a braking switch, and an electrical energy storage component. The electrical energy storage component is configured to provide an electrical energy to the braking branch. When the motor is in the braking state, if the braking branch is detected as short-circuited, the connection between the stator winding and the rotor of the driving branch is turned on. Further provided is a power tool including the above control circuit.

18 Claims, 10 Drawing Sheets

(56) References Cited

U.S. PATENT DOCUMENTS

| | | | | |
|---|---|---|---|---|
| 7,476,821 B1* | 1/2009 | Knuppel | ............... | H01H 3/20 |
| | | | | 200/332.2 |
| 2017/0077842 A1* | 3/2017 | Yang | ............... | H02J 7/00 |
| 2018/0147682 A1* | 5/2018 | Duan | ............... | H02P 3/02 |

FOREIGN PATENT DOCUMENTS

| CN | 103312247 A | 9/2013 |
|---|---|---|
| EP | 2509212 A2 | 10/2012 |
| EP | 2947765 A2 | 11/2015 |
| JP | 11308886 A | 11/1999 |

\* cited by examiner

CONTROL CIRCUIT AND POWER TOOL

CROSS-REFERENCE TO RELATED APPLICATIONS

The present application claims the benefit of and is a continuation of International Application Number PCT/CN2018/076730, filed on Feb. 13, 2018, which application claims the benefit of Chinese Patent Application 201710102200.1, filed on Feb. 24, 2017, and Chinese Patent application number 201711391174.5, filed on Dec. 21, 2017, the disclosures of which are incorporated herein by reference in their entirety.

TECHNICAL FIELD

The present disclosure relates to the field of motor control, in particular, to a control circuit for a motor and a power tool including the control circuit.

BACKGROUND

A motor is mainly used to generate a driving torque. It is a power source for electrical appliances or various machines, to convert electrical energy into mechanical energy.

In the field of power tools, the motor is connected to a workpiece to drive the workpiece into action to perform an associated function. When an operating switch of the power tool is closed, the motor and the power source of the power tool form a closed power supply circuit to drive the motor to work. When the operating switch is opened, the power supply is cut off, but the motor and the workpiece driven by the motor may not stop action immediately due to inertia. Taking an angle grinder, this tool is typically used for cutting and sanding, where a sanding disc is a working part of the angle grinder. When the operator releases the operating switch, it is desired that the motor stops rotating as soon as possible.

The statements in this section merely provide background information related to the present disclosure and may not constitute prior art.

SUMMARY

In one aspect of the disclosure, there is provided a control circuit for a motor including a stator winding and a rotor, the control circuit has a driving state and a braking state and includes a main control switch, a driving branch, a braking branch, and a control unit.

In one example, there is provided a control circuit for a motor including a stator winding and a rotor, the control circuit has a driving state and a braking state and includes a main control switch, a driving branch, a braking branch, and a control unit.

In one example, the control circuit enters the driving state in response to the main control switch being closed and the control circuit enters the braking state in response to the main control switch being opened.

In one example, the driving branch includes a branch formed by the stator winding, a driving switch, and the rotor, and is configured to control a connection between the stator winding and the rotor to be turned on or off.

In one example, the braking branch includes a branch formed by the stator winding, a braking switch, and an electrical energy storage component. The electrical energy storage component is configured to provide an electrical energy to the braking branch, and is arranged between two terminals of the rotor.

In one example, the control unit is electrically connected to the main control switch, to the driving switch, and to the braking switch separately, and is configured to control the main control switch, the driving switch, and the braking switch to be closed or opened.

In one example, the connection between the stator winding and the rotor in the driving branch is turned on in response to detecting that, in the braking state, a braking parameter of the braking branch exceeds a predetermined value.

In one example, a diode is connected in series between the electrical energy storage component and the rotor, to allow the electrical energy storage component to be unidirectionally charged or discharged.

In one example, the driving switch is connected in series between the stator winding and the rotor, and is configured to control the connection between the stator winding and the rotor to be turned on or off.

In one example, the control unit includes a brake driving circuit. The brake driving circuit is configured to send a pulse signal to the braking switch in the driving state to control the braking switch to be closed or opened.

In one example, the braking branch is further provided with a current detecting unit. The current detecting unit is configured to detect, under the braking state, whether a braking current in the braking branch exceeds a preset threshold. If the braking current exceeds the preset threshold, the control circuit is configured to control the braking switch to stay in an open state and to cut off the connection between the electrical energy storage component and the stator winding.

In one example, the control circuit is configured to control the driving switch to be closed in response to a braking current in the braking branch exceeding a preset threshold to allow a current between the stator winding and the rotor to be turned on.

In one example, the braking branch further includes a first brake control switch and a second brake control switch. From one terminal to another terminal of the stator winding, the braking branch includes the first brake control switch, the electrical energy storage component, the braking switch, and the second brake control switch, which are sequentially connected in series.

In one example, the control circuit includes a voltage detecting unit. The voltage detecting unit is configured to detect under the driving state whether the braking switch is short-circuited. If the braking switch is short-circuited, the control circuit is configured to control the first brake control switch and the second brake control switch to make the braking branch not closed in the braking state.

In one example, in response to a braking current in the braking branch exceeding a preset threshold under the braking state, the control circuit is configured to control the first brake control switch and/or the second brake control switch to be opened to cut off the conduction of the braking branch.

In one example, the control unit includes a first voltage detecting unit, a brake driving circuit, a first brake protection circuit, a second brake protection circuit and a central processing unit. The braking branch is further provided with a second voltage detecting unit.

In one example, the first voltage detecting unit is configured to detect under the driving state a first voltage at a joint of the braking switch and the second brake control switch and send the first voltage to the central processing unit.

In one example, the second voltage detecting unit is arranged between the braking switch and the electrical energy storage component and is configured to send a second voltage to the first brake protection circuit.

In one example, the central processing unit is configured to determine whether the braking switch is short-circuited based on the first voltage and to further control whether to turn on the braking branch under the braking state. The central processing unit is configured to send, under the braking state, a pulse signal to the brake driving circuit.

In one example, the first brake protection circuit is configured to output a first protection signal or a second protection signal to the brake driving circuit based on the second voltage. The first brake protection circuit is configured to output a third protection signal to the second brake protection circuit, in response, the first brake protection circuit outputs the first protection signal to the brake driving circuit.

In one example, the brake driving circuit is configured to generate a first driving signal based on the pulse signal and the first protection signal, and the first driving signal is a signal that controls the braking switch to be periodically closed. The brake driving circuit is configured to generate a second driving signal based on the pulse signal and the second protection signal and the second driving signal is a signal that controls the braking switch to be opened.

In one example, the second brake protection circuit is configured to generate a fourth protection signal based on the third protection signal and the fourth protection signal is a signal that controls the driving switch to be closed.

In one example, the first brake protection circuit employs a self-locking circuit.

In one example, in response to detecting under the braking state that a braking force generated by the braking branch exceeds a predetermined value, the connection between the stator winding and the rotor of the driving branch is turned on.

In one example, there is provided a power tool that includes a housing. An operating switch and a working part are arranged on the housing, a motor for driving the working part is arranged inside the housing. The power tool further includes any one of the above-described control circuit for a motor.

In one example, the power tool is an angle grinder and the working part is a sanding disc.

In one example, there is provided a control circuit for a motor including a stator winding and a rotor. The control circuit comprises a driving branch and a braking branch and has a driving state and a braking state.

In one example, the driving branch includes a branch formed by the stator winding and the rotor.

In one example, the braking branch includes a branch formed by the stator winding, a braking switch, and an electrical energy storage component. The electrical energy storage component is configured to provide an electrical energy to the braking branch.

In one example, the connection between the stator winding and the rotor in the driving branch is turned on in response to detecting that a braking parameter of the braking branch in the braking state exceeds a predetermined value.

In one example, under the braking state the stator winding and the rotor of the driving branch are disconnected. In response to detecting that the braking branch is short-circuited, the braking branch is cut off and the connection between the stator winding and the rotor is turned on.

In one example, a driving switch is arranged between the stator winding and the rotor. In response to the braking switch being short-circuited under the braking state, the driving switch is configured to be closed to turn on the connection between the stator winding and the rotor.

In one example, the connection between the stator winding and the rotor of the motor is turned on both under the driving state and under the braking state.

In one example, the braking branch is further provided with at least one brake control switch. In response to the braking switch being short-circuited, at least one of the at least one brake control switch is configured to opened to cut off the braking branch.

In one example, a diode is connected in series between the electrical energy storage component and the rotor, to allow the electrical energy storage component to be unidirectionally charged or discharged.

In one example, the circuit control includes a braking circuit. The braking circuit is configured to send, under the braking state, a pulse signal to the braking switch to control the braking switch to be closed or opened.

In one example, the braking branch is further provided with a current detecting unit. The current detecting unit is configured to detect under the braking state whether a braking current in the braking branch exceeds a preset threshold. If the braking current in the braking branch exceeds the preset threshold, the braking switch is opened to cut off the connection between the electrical energy storage component and the stator winding.

In one example, when it is detected under the braking state that a braking force generated by the braking branch exceeds a predetermined value, the connection between the stator winding and the rotor of the driving branch is turned on.

In one example, there is provided a power tool, including a housing. An operating switch and a working part are arranged on the housing. A motor for driving the working part is arranged inside the housing. The power tool further includes any one of the above control circuit for a motor.

In one example, the power tool is an angle grinder, and the working part is a sanding disc.

In one example, there is provided a control circuit for a motor including a stator winding and a rotor. The control circuit comprises a driving branch and a braking branch and has a driving state and a braking state.

In one example, the driving branch is turned on in response to a braking parameter of the braking branch in the braking state exceeding a predetermined value.

In one example, the driving branch includes a branch formed by the stator winding and the rotor. In response to detecting under the braking state that a braking force generated by the braking branch exceeds the predetermined value, the connection between the stator winding and the rotor of the driving branch is turned on.

In one example, under the braking state, the stator winding and the rotor of the driving branch are disconnected, and in response to detecting that the braking branch is short-circuited, the braking branch is cut off and the connection between the stator winding and the rotor is turned on.

In one example, a driving switch is arranged between the stator winding and the rotor.

In response to the braking switch being short-circuited under the braking state, the driving switch is configured to be closed to turn on the connection between the stator winding and the rotor.

In one example, the connection between the stator winding and the rotor of the motor is turned on both under the driving state and under the braking state.

In one example, in response to detecting, under the braking state, that a braking force generated by the braking branch exceeds a predetermined value, the connection between the stator winding and the rotor of the driving branch is turned on.

In one example, there is provided a power tool that includes a housing. An operating switch and a working part are arranged on the housing. A motor for driving the working part is arranged inside the housing. The power tool further includes any one of the above-described control circuits for a motor.

In one example, the power tool is an angle grinder, and the working part is a sanding disc.

Further areas of applicability will become apparent from the description provided herein. It should be understood that the description and specific examples are intended for purposes of illustration only and are not intended to limit the scope of the present disclosure.

BRIEF DESCRIPTION OF DRAWINGS

The drawings described herein are for illustrative purposes only and not all possible implementations, and are not intended to limit the scope of the present disclosure. Corresponding reference numerals indicate corresponding parts throughout the several views of the drawings.

DETAILED DESCRIPTION

The following description of the preferred examples is in no way intended to limit the disclosure, its application, or uses.

For ease of illustration, the power tool uses an angle grinder 10 as an example. Of course, the power tool may also be other tools which can convert the output torque into other forms of motion. These tools may be used to polish workpieces, such as a sander; used to cut workpieces, such as a reciprocating saw, a circular saw and a curve saw; used for impact, such as an electric hammer; a gardening tool such as a pruning machine and a chain saw; used for other purposes such as a blender. Substantial content of the technical solutions disclosed below may be employed, as long as the power tool includes a motor 120 driving the working components to move.

Figure 1:
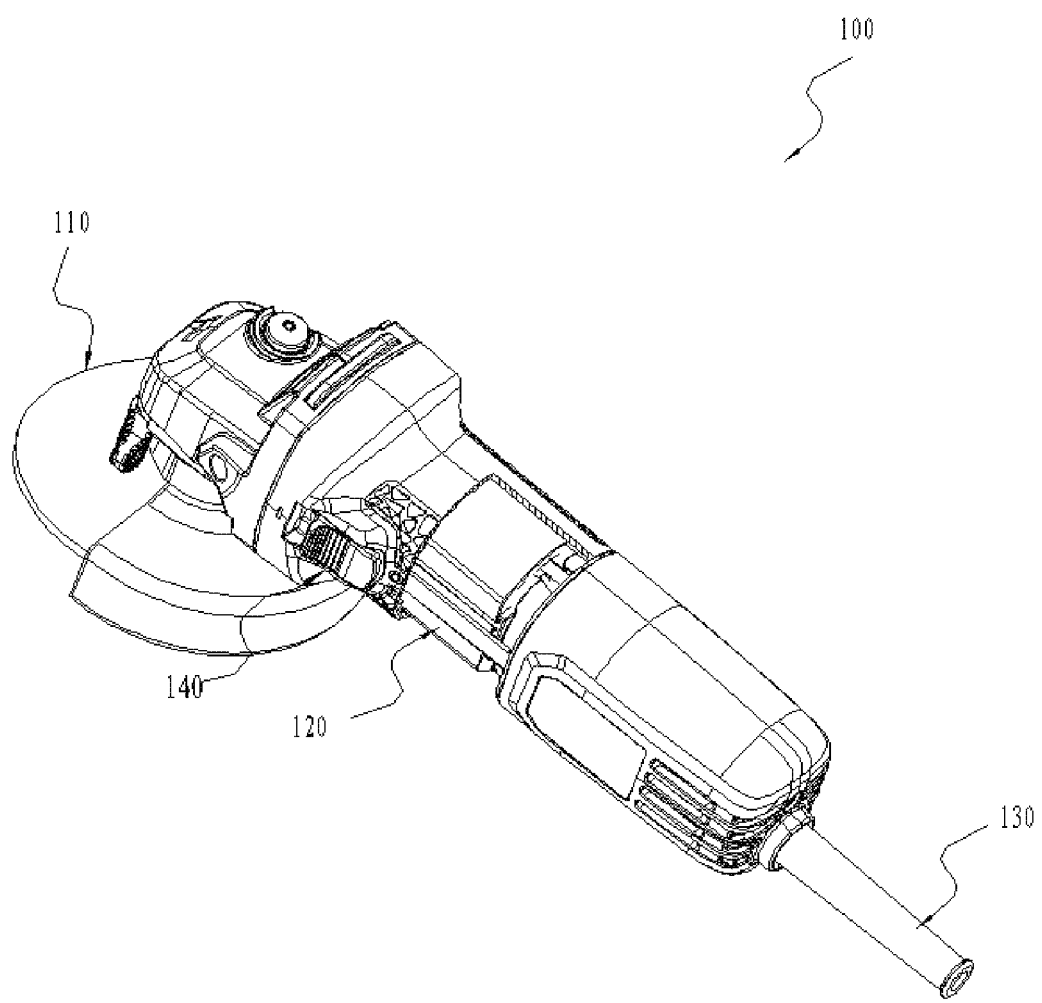
FIG. 1 is a schematic diagram of an angle grinder as one example.

As illustrated in FIG. 1, an angle grinder 100 includes a housing, a sanding disc 110 and an operating switch 140 arranged on the housing, and a power cable 130 extending outward from the housing. A motor 120 and a control circuit are arranged inside the housing. The sanding disc 110 is used to implement a tool function such as sanding or cutting. The motor 120 is configured to drive the sanding disc 110 to work when the power source is turned on.

The power source cable 130 includes two connection terminals for accessing an electrical energy to supply power to the motor 120. The power cable 130 can be connected to a direct current or an alternating current power source. Specifically, the power source 130 is an alternating current plug, and inserted into a mains alternating current power for accessing the electrical energy to power the motor 120. The operating switch 140 is a depressible operating switch 140, a gear-type operating switch 140 or other switch which can be operated by the user. The operating switch 140 is arranged on a position of the housing of the angle grinder 100 for the user to operate. When the operating switch 140 is trigged by the user, the control circuit of the motor turns on a power supply path between the motor 120 and the power cable 130. When the operating switch 140 is released by the user, the control circuit of the motor cuts off the power supply path between the motor 120 and the power cable 130.

The sanding disc 110 is mounted or fixed on an output shaft of the motor 120. The rotor rotates and drives the output shaft to rotate, thereby driving the sanding disc 110 for sanding or cutting. It should be noted that any device that can be driven by the rotor to rotate would be considered as the output shaft of the present disclosure. When the operating switch 140 is released by the user, the rotor would keep driving the sanding disc 110 to rotate due to inertia. At this moment, if a braking force opposite to a rotational direction of the rotor is applied to the rotor, the rotor can be forced to stop rotating as soon as possible.

Figure 2:
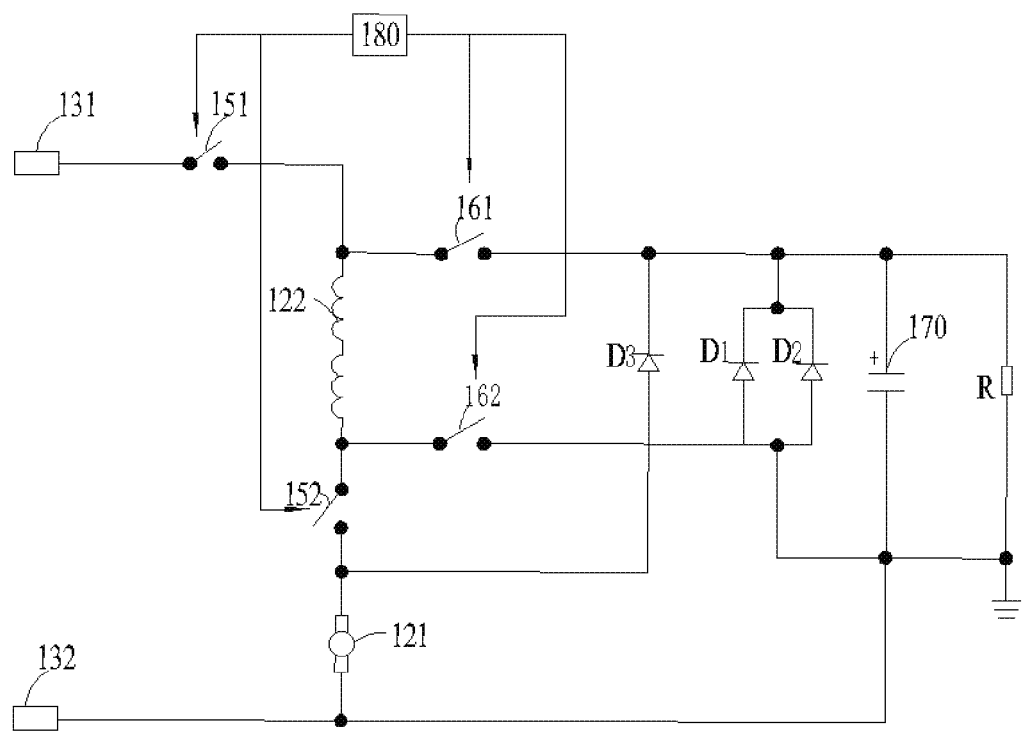
FIG. 2 is a first circuit diagram of a control circuit for a motor.

In one example, the control circuit in FIG. 2 includes a main control switch 151, a driving branch, a braking branch, and a control unit 180. The control circuit has a driving state and a braking state. When the main control switch 151 is closed, the control circuit is in the driving state. When the main control switch 151 is opened, the control circuit is in the braking state. When the control unit 180 detects that the operating switch 140 arranged on the housing of the power tool is triggered, the main control switch 151 is closed and the control circuit is in the driving state. When the control unit 180 detects that the operating switch 140 is released, the main control switch 151 is opened and the control circuit is in the braking state.

The main control switch 151 is arranged on a power supply between the driving branch and the external power source. When the main control switch 151 is closed, the control circuit is in the driving state. When the main control switch 151 is opened, the control circuit is in the braking state. A first terminal of the main control switch 151 is electrically connected to a first power terminal 131 of the power cable 130, a second terminal of the main control switch 151 is electrically connected to a first terminal of the driving branch, and a second power terminal 132 of the power cable 130 is electrically connected to a second terminal of the driving branch. The main control switch 151 is configured to establish and cut off an electrical connection between the driving branch and the power cable 130. When the main control switch 151 is turned on, the first and second terminal of the main control switch 151 are connected, so that the electrical connection between the driving branch and the power cable is established. When the main control switch 151 is turned off, the first and second terminal of the main control switch 151 are disconnected, so that the electrical connection between the driving branch and the power cable 130 is cut off.

The motor above may employ a series excitation motor, a series excited motor, a shunt motor, a synchronous motor or an asynchronous motor. In the present example, a series excitation motor or a series excited motor is taken as an example, including a stator winding 122 and a rotor 121. The driving branch includes a branch formed by the connection in series of the stator winding 122, a driving switch 152, and a rotor 121. The braking branch includes a branch formed by the connection in series of the stator winding 122, a brake control switch group, and an electrical energy storage component 170.

In one example, as illustrated in FIG. 2, the driving switch 152 is connected in series between the stator winding 121 and the rotor 121 to form a driving branch. A first terminal of the stator winding 122 as the first terminal of the driving branch is electrically connected to the second terminal of the main control switch 151, a second terminal of the stator winding 122 is electrically connected to a first terminal of the driving switch 152, a second terminal of the driving switch 152 is electrically connected to a first terminal of the rotor 121, and a second terminal of the rotor 121 as the second terminal of the driving branch is electrically connected to the second power terminal 132 of the power cable 130. In the driving state, the driving switch 152 is closed, the stator winding 122 and the rotor 121 are connected, the current flowing through the stator winding 122 enables the stator winding 122 to generate a magnetic field to drive the rotor 121 to rotate, and then the rotor 121 rotates and drives the output shaft to rotate, thereby driving the sanding disc 110 connected to one terminal of the output shaft to work. The driving switch 152 is one of power devices, such as MOS tube and a silicon controlled rectifier.

A brake control switch group includes a first brake control switch 161 and a second brake control switch 162. A first terminal of the first brake control switch 161 is electrically connected to the first terminal of the stator winding 122, a second terminal of the first brake control switch 161 is electrically connected to the electrical energy storage component 170, and a second terminal of the electrically energy storage component 170 is grounded. A first terminal of the second brake control switch 162 is electrically connected to the second terminal of the stator winding 122, and a second terminal of the second brake control switch 162 is electrically connected to the second terminal of the electrical energy storage component 170. The braking branch is formed by the connection in the above manner of the brake control switch group, the electrical energy storage component 170 and a stator winding 122. The first brake control switch 161 may employ one of a relay, a field-effect tube, or a thyristor. The second brake control switch 162 may employ one of a relay, a field-effect tube, or a thyristor.

The electrical energy storage component 170 is an electrical energy source for the braking branch. In order to stabilize a direction of a braking current of the braking branch, the electrical energy storage component 170 employs a capacitance with polarity, and connected in parallel across the rotor 121. Since the electrical energy storage component 170 employs a capacitance with polarity, which can only be unidirectionally charged and discharged, and an induced electromotive force that periodically changes in direction is generated when the motor 120 is normally operated in the alternating current power source, a diode D3 is connected in series between the first terminal of the rotor 121 and the first terminal of the electrical energy storage component 170. A negative electrode D3 is electrically connected to the first terminal of the electrical energy storage component 170, and a positive electrode of the diode D3 is electrically connected to the first terminal of the rotor 121, to form a charging branch. The addition of the diode D3 can ensure that the changeable induced electromotive force can only unidirectionally charge the capacitor, avoiding reversing charging and damaging the capacitor. A bleeder resistor R is connected in parallel between two terminals of the electrical energy storage component 170. A discharging loop is formed by the electrical energy storage component 170 and the bleeder resistor R, realizing a slow discharge of the capacitor.

Figure 3:
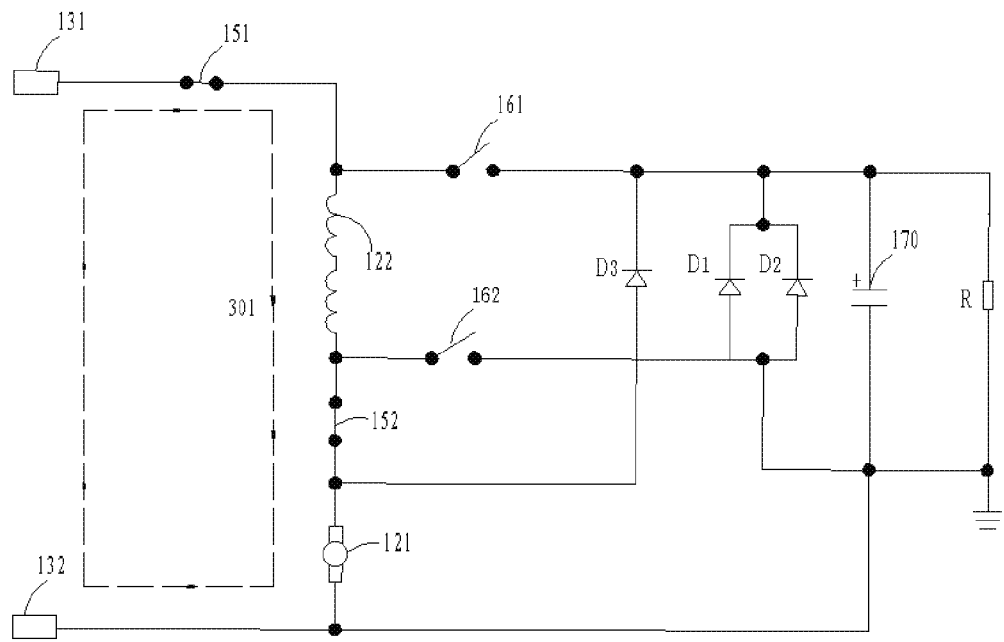
FIG. 3 is a schematic diagram illustrating a driving current path of the control circuit of FIG. 2 under a driving state.

Referring to FIG. 3, the working principle of the above circuit is further described. When the operating switch 140 arranged on the housing of the power tool is triggered, the control unit 180 detects that the operating switch 140 is switched to a closed state from an open state, and controls the main control switch 151 and the driving switch 152 to be turned on, and the power cable 130 is connected to the driving branch to supply power to the motor 120. It is assumed that the first power terminal 131 is a high voltage terminal and the second power terminal 132 is a low voltage terminal, a current path is formed as shown by 301 in FIG. 3. The current flows through the main control switch 151 from the power source via the first power terminal 131, enters the driving branch, flows through the stator winding 122, the driving switch 152 and the rotor 121 in sequence, and then returns to the power source via the second power terminal 132, thereby driving the motor 120 to work.

Figure 4:
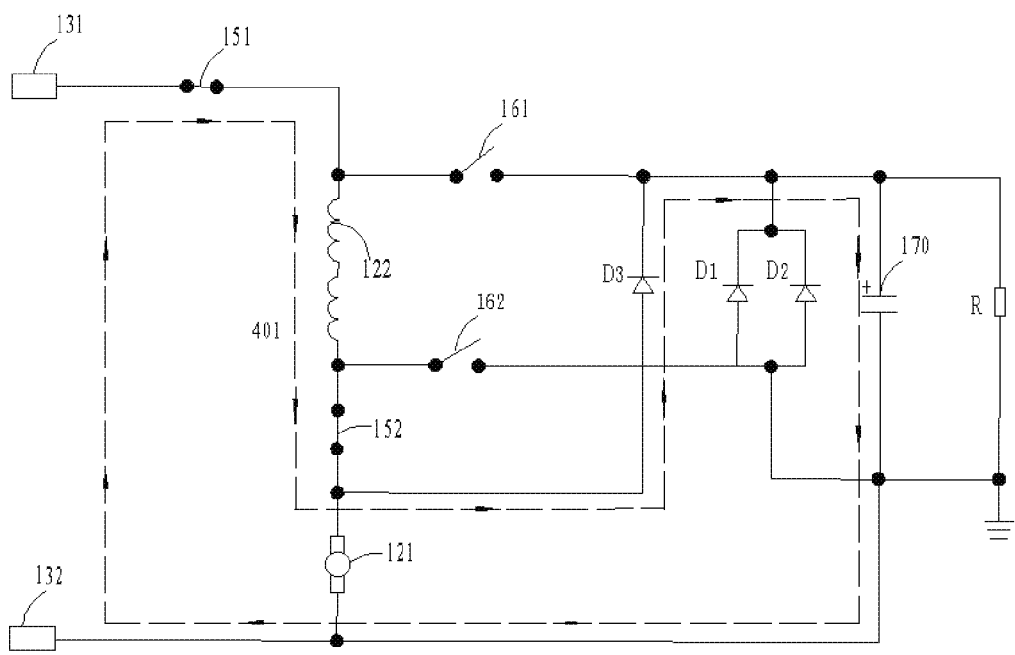
FIG. 4 is a schematic diagram illustrating a charging current path of the control circuit of FIG. 2 under the driving state.

Referring to FIG. 4, the driving branch is closed, at this moment, a current path of the charging branch is formed as shown by 401. The current flows in via the first power terminal 131, flows through the main control switch 151, the stator winding 122, the driving switch 152, and the electrical energy storage component 170 in sequence, and then returns to the second power terminal 132, thereby forming the charging branch to charge the electrical energy storage component 170.

Figure 5:
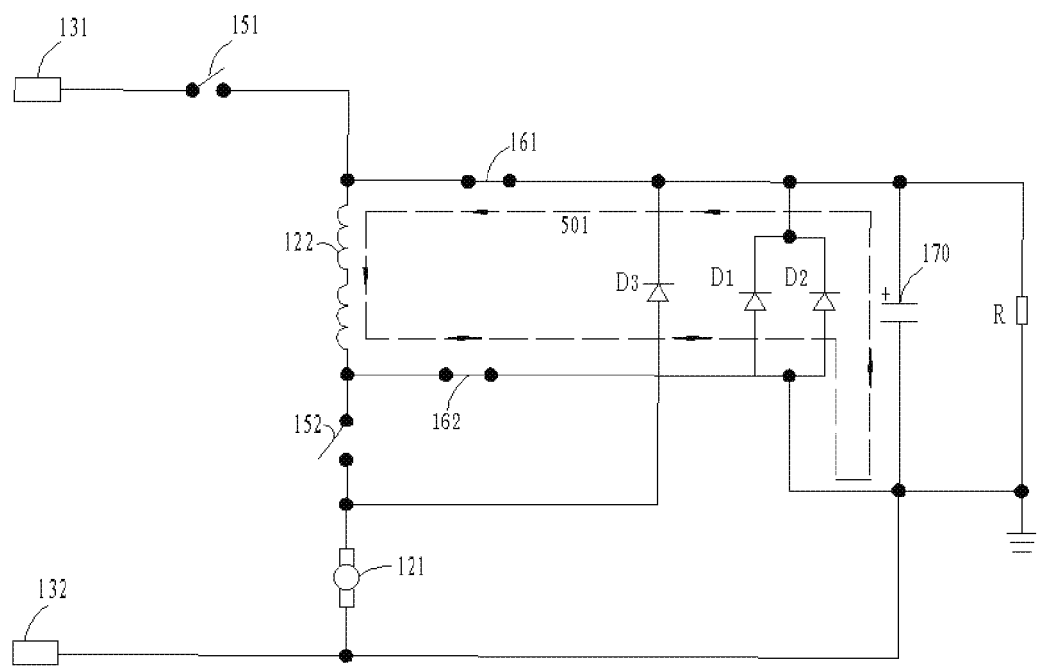
FIG. 5 is a schematic diagram illustrating a braking current path of the control circuit of FIG. 2 under a braking state.
Figure 6:
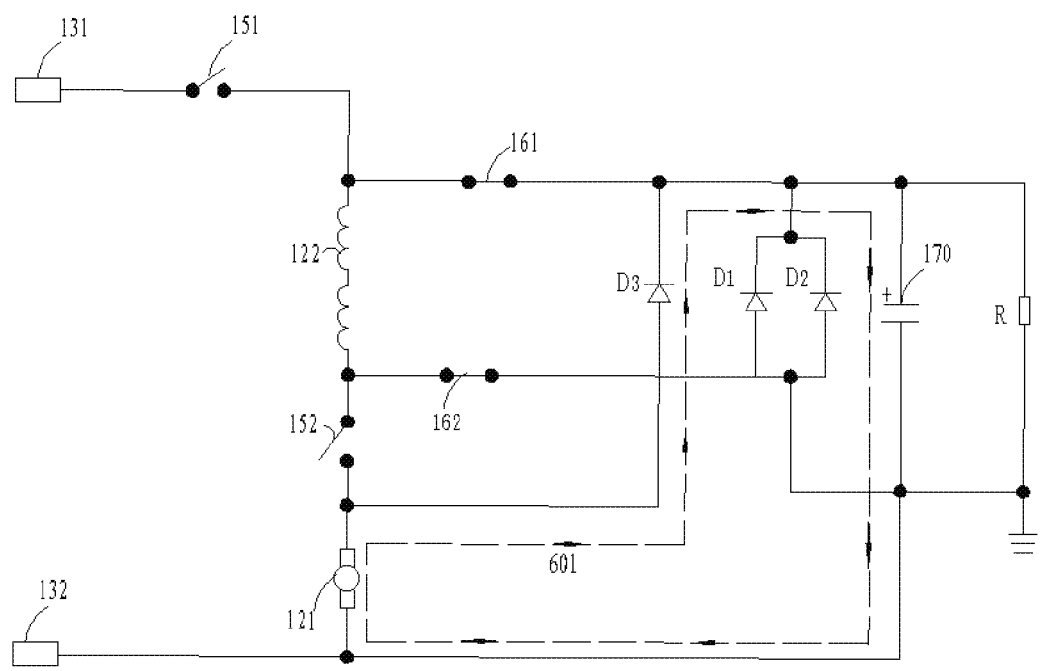
FIG. 6 is a schematic diagram illustrating a charging current path of the control circuit of FIG. 2 under the braking state.

Referring to FIG. 5, when the operating switch 140 arranged on the housing of the power tool is switched to the open state from the closed state, the control unit 180 controls, in response, the main control switch 151 and the driving switch 152 to be turned off, and the first brake control switch 161 and the second brake control switch 162 of the brake control switch group to be turned on. At this moment, the driving branch is electrically disconnected to the external power source, and unable to provide the driving force to the rotor 121 and the electrical energy storage component 170 begins to operate as the electrical energy source for the braking branch. In a braking current path as shown by 501, the current flows through the first brake control switch 161, the stator winding 122, the second brake control switch 162 in sequence via the first terminal of the electrical energy storage component 170, and returns to the second terminal of the electrical energy storage component 170. The stator winding 122 generates the magnetic field due to the braking current and acts on the rotor 121. At the same time, referring to FIG. 6, as the electrical energy storage component 170 is discharged, rotor 121 moves in the magnetic field generated by the braking current and generates an electromotive force. When the electromotive force generated by the rotor 121 is higher than an electromotive force of the electrical energy storage component 170, the electrical energy storage component 170 can be charged, and the energy of the rotor 121 is further consumed. In a current path as shown by 601 in the drawings, the current flows through the diode D3 and the electrical energy storage component 170 in sequence via the first end of the rotor 121, and returns to the rotor 121. When the current flows through the rotor 121, the magnetic field generated by the braking current in the stator winding 122 can apply a braking force on the rotor 121, thereby rapidly reducing a rotational speed of the rotor 121.

In one example, in order to avoid the breakdown or burnout of the stator winding 122 due to too large braking current, freewheeling diodes D1 and D2 are connected in parallel across the stator winding 122. Positive electrodes of the freewheeling diodes D1 and D2 are both electrically connected to the second terminal of the second brake control switch 162, and negative electrodes of the freewheeling diodes D1 and D2 are both electrically connected to second terminal of the first brake control switch 161. A freewheeling loop is formed by the freewheeling diodes D1, D2 and stator winding 122, so that the electrical energy of the stator winding 122 is consumed in the freewheeling loop in a freewheeling manner and a certain protection against the stator winding 122 is provided.

Figure 7:
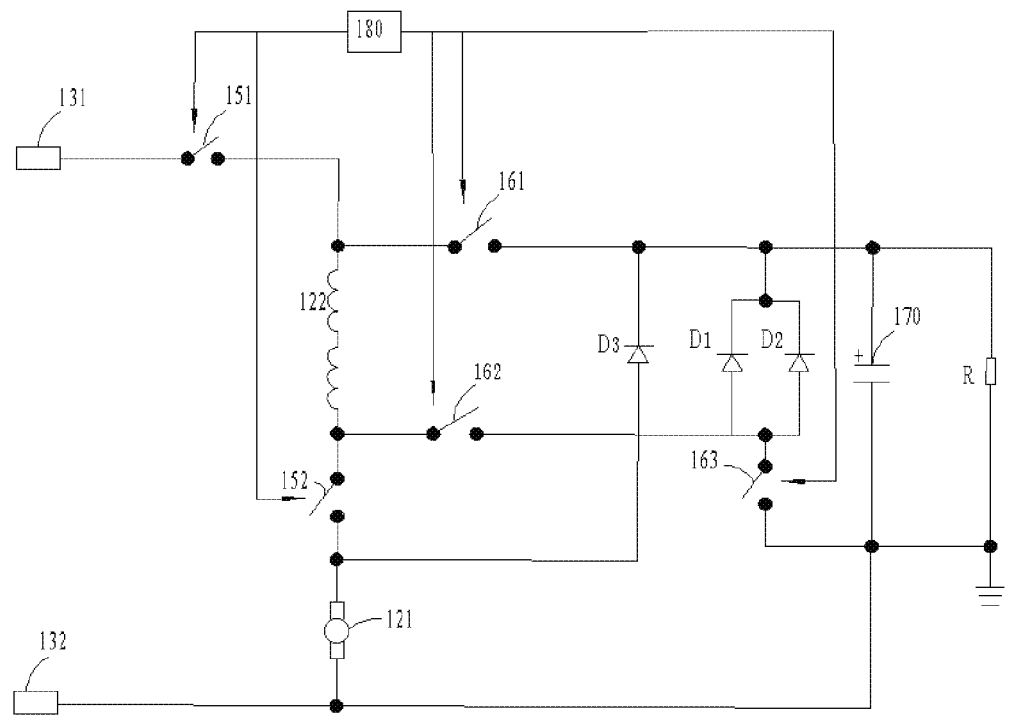
FIG. 7 is a second circuit diagram of a control circuit for a motor.

As discussed above, the control circuit in the braking state generates a relatively large braking current, the stator winding 122 can be easily damaged in condition that the braking branch continues to be closed. As illustrated in FIG. 7, besides the same components and connection relationship as that in the above control circuit, the control circuit of the present example further includes a braking switch 163, namely, the braking switch 163 is added to the braking branch. A first terminal of the braking switch 163 is electrically connected to the second terminal of the second brake control switch 162, and a second terminal of the braking switch 163 is electrically connected to the second terminal of the electrical energy storage component 170. The braking switch 163 is electrically connected to the control unit 180. The control unit 180 can control ON-OFF of the braking switch 163 to turn on or cut off the braking current loop of the braking branch according to the magnitude of the braking current, thereby controlling the magnitude of the braking current. In one example, the control unit 180 can send a pulse signal, such as a PWM signal, to the braking switch 163 to control the braking switch 163 to be periodically turned on or turned off, thereby realizing the control over a duty ratio of the braking current. In one example, the braking switch 163 employs one of field effect transistors, such as an IGBT.

In light of the above description, in the braking state, the braking switch 163 plays a key role in the control over the braking current in the braking branch. Thus, once the braking switch 163 is short-circuited or the pulse signal to which the control unit 180 outputs goes abnormal (for example, a high level is always outputted), the braking branch in the braking state is always in a conductive state, thereby causing the braking current to be too large and the occurrence of an emergency brake situation.

There may be a possibility that the short circuit fault occurs on the braking switch 163 before the control circuit enters the braking state, and there may be also a possibility that the short circuit fault occurs on the braking switch 163 when the control circuit is in the braking state. The voltages at the two terminals of the braking switch 163 may have different amplitudes or different amplitude ranges depending on the different states. When the control circuit is in the driving state, the braking branch is not closed. If the braking switch 163 is short-circuited, since the second terminal of the braking switch 163 is grounded, the voltage at the first terminal of the braking switch 163 is pulled down by the ground terminal and close to 0, while the voltage may be +5V (a triode collector voltage) under the normal condition. According to the above analysis, the braking switch 163 can be detected before the control circuit enters the braking state. If the braking switch 163 has been short-circuited, the control circuit no longer turns on the braking branch after the operating switch 140 is turned on.

If the short circuit fault occurs on the braking switch 163 or the control unit sends the wrong pulse signal when the control circuit is in the braking state, for example, the control unit 180 keeps outputting the high level, it easily causes the braking current to become larger. With the braking current becomes larger, the control over the braking branch can be realized by arranging a current detecting unit for detecting the current on the braking branch. When the braking current becomes larger, the voltage at the second terminal of the braking switch 163 becomes larger therewith, thus, a voltage threshold can also be set accordingly to determine the braking current, thereby further controlling the braking branch.

Figure 8:
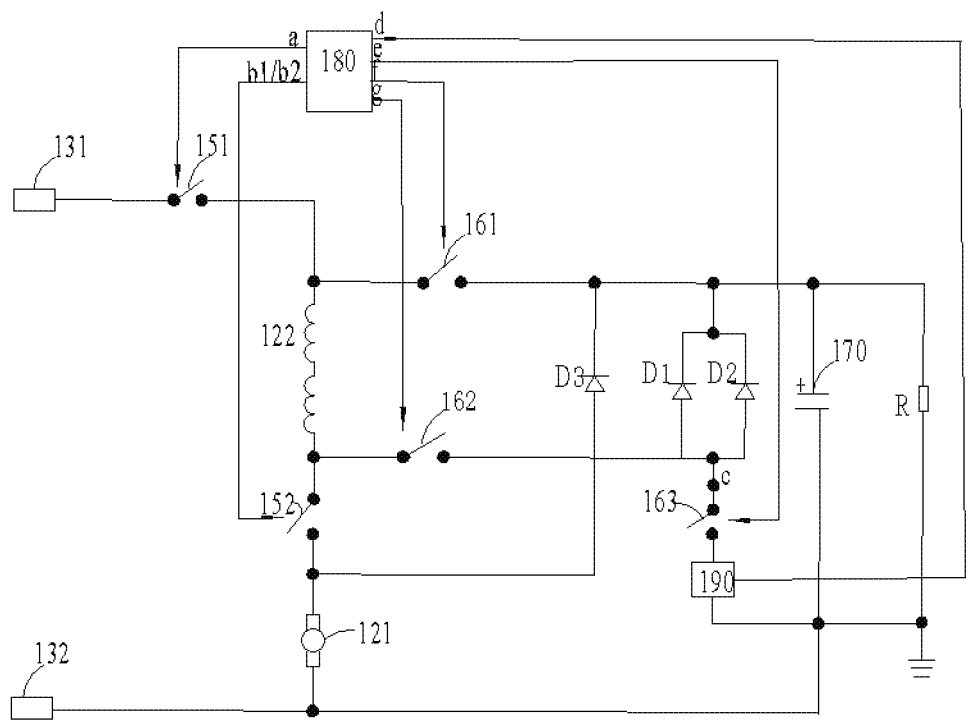
FIG. 8 is a third circuit diagram of a control circuit for a motor.
Figure 9:
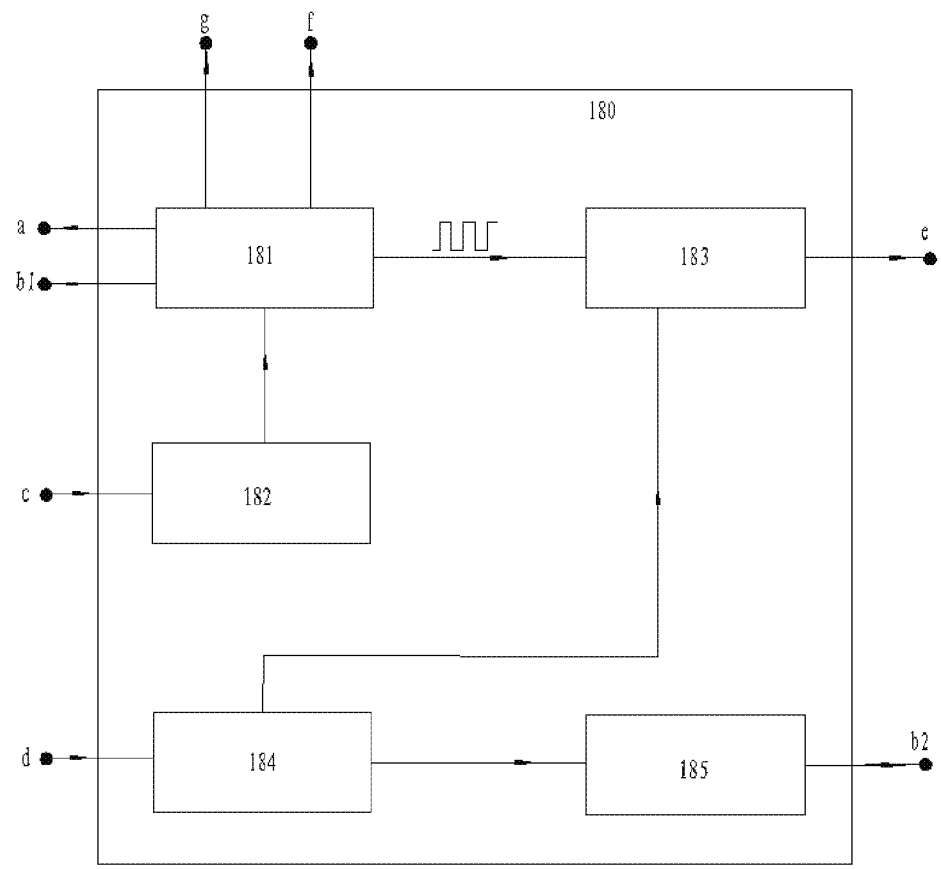
FIG. 9 is a block diagram of the control circuit of FIG. 8.

In one example, referring to FIG. 8 and FIG. 9, the braking branch is further provided with a second voltage detecting unit 190. The second voltage detecting unit 190 is electrically connected between the second terminal of the braking switch 163 and the ground, and used to detect the voltage at the second terminal of the braking switch 163 in the braking state. The control unit 180 includes a central processing unit (MCU) 181, a first voltage detecting unit 182, a brake driving circuit 183, and a first brake protection circuit 184. The central processing unit 181 is electrically connected to the first voltage detecting unit 182 and the brake driving circuit 183 separately. The second voltage detecting unit 190 is electrically connected to the first brake protection circuit 184 (corresponding to a node d). The first brake protection circuit 184 is electrically connected to the brake driving circuit 183. The central processing unit 181 is electrically connected to the main control switch 151 (corresponding to a node a), the driving switch 152 (corresponding to a node b1), the first brake control switch 161 (corresponding to a node f), and the second brake control switch 162 (corresponding to a node g) separately. The first voltage detecting unit 182 is electrically connected to the first terminal of the braking switch 163 (corresponding to a node c). The brake driving circuit 183 is electrically connected to the braking switch 163 (corresponding to a node e).

The first voltage detecting unit 182 is used to detect a voltage U1 at the first terminal of the braking switch 163. The central processing unit 181 determines whether or not the short circuit fault occurs on the braking switch 163 according to a voltage value detected by the first voltage detecting unit 182, if the short circuit fault occurs, the braking branch would be opened in the braking state; if the short circuit fault does not occur, the braking branch is normally conductive. The central processing unit 181 in the braking state sends the pulse signal to the brake driving circuit 183. The first brake protection circuit 184 outputs a first protection signal or a second protection signal according to a detecting result of the second voltage detecting unit 190, and sends the first protection signal or the second protection signal to the brake driving circuit 183. The brake driving circuit 183 generates a first driving signal according to the pulse signal sent by the central processing unit 181 and the first protection signal. The first driving signal is a signal that controls the braking switch 163 to be periodically closed. The brake driving circuit 183 generates a second driving signal according to the pulse signal sent by the central processing unit 181 and the second protection signal. The second driving signal is a signal that controls the braking switch 163 to be opened.

According to the foregoing, when the control circuit adapted to the motor is in the braking state, if the pulse signal outputted by the central processing unit 181 is abnormal, for example, the central processing unit 181 keeps outputting the high level, the braking current cannot be effectively controlled at this moment even the braking switch 163 is closed. In order to avoid this situation, as illustrated in FIG. 9, the control unit 180 further includes a second brake protection circuit 185. The second brake protection circuit 185 is electrically connected to the first brake protection circuit 184, and the driving switch 152 (corresponding to a node b2). When the first brake protection circuit 184 sends the second protection signal to the braking switch 163, the first brake protection circuit 184 sends a third protection signal to the second brake protection circuit 185 at the same time. The second brake protection circuit 185 generates a fourth protection signal according to the third protection signal. The fourth protection signal is a signal that controls the driving switch 152 to be closed. When the driving switch 152 is closed, a part of the braking current in the stator winding 122 flows downward through the rotor 121, and counteracts a part of the current in the rotor 121 charging the capacitor, thereby reducing the braking current.

Figure 10:
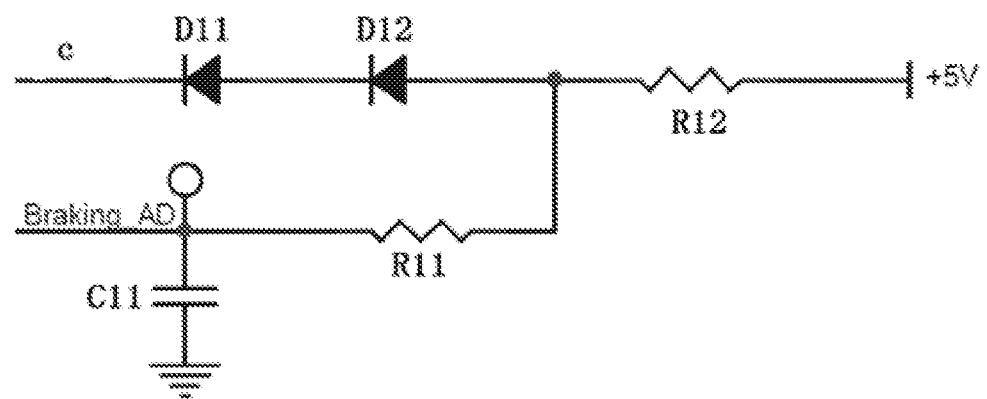
FIG. 10 is a circuit diagram of a first voltage detecting unit in a control circuit.

In one example, the first voltage detecting unit 182 may employ a circuit structure as illustrated in FIG. 10. The first voltage detecting unit 182 includes two diodes D11 and D12 connected in series. Polarities of the diodes D11 and D12 are arranged in the same direction. A negative electrode of the diode D11 is connected to the first terminal of the braking switch 163 (a node c). A positive electrode of the diode D11 is connected to a negative electrode of the diode D12. A positive electrode of the diode D12 is grounded through a series circuit of a resistor R11 and a capacitor C11, on the other hand, is connected to a +5V direct current power source through a resistor R12. One terminal of the resistor R11 connected to the capacitor C11 (Braking_AD) is connected to the central processing unit 181. When the circuit does not enter the braking state, a voltage at the node c is, in condition that the braking switch 163 is not short-circuited, the high level (the direct current power source of the switch is generally +5V), the diodes are nonconductive at this moment, a voltage value U1 outputted by the terminal Braking_AD is the high level signal. If the braking switch 163 is short-circuited, the voltage at the node c is pulled down by the grounded terminal, the diodes D11 and D12 are connected, the voltage value U1 outputted by the terminal Braking_AD is the low level signal. The central processing unit 181 can acquire whether or not the braking switch 163 is short-circuited according to a predetermined threshold.

As discussed above, after measures are taken on the braking branch, the braking current is decreased. In order to avoid the situation that the first brake protection circuit 184 sends the first protection signal, namely the high level signal, to the brake driving switch 183 again after the second voltage detecting unit 190 detects that the braking current is decreased. The first brake protection circuit 194 may employ a self-locking circuit structure. Once the braking current exceeds the preset threshold, the first brake protection circuit 184 will keep outputting the low level signal to the braking switch 163.

Figure 11:
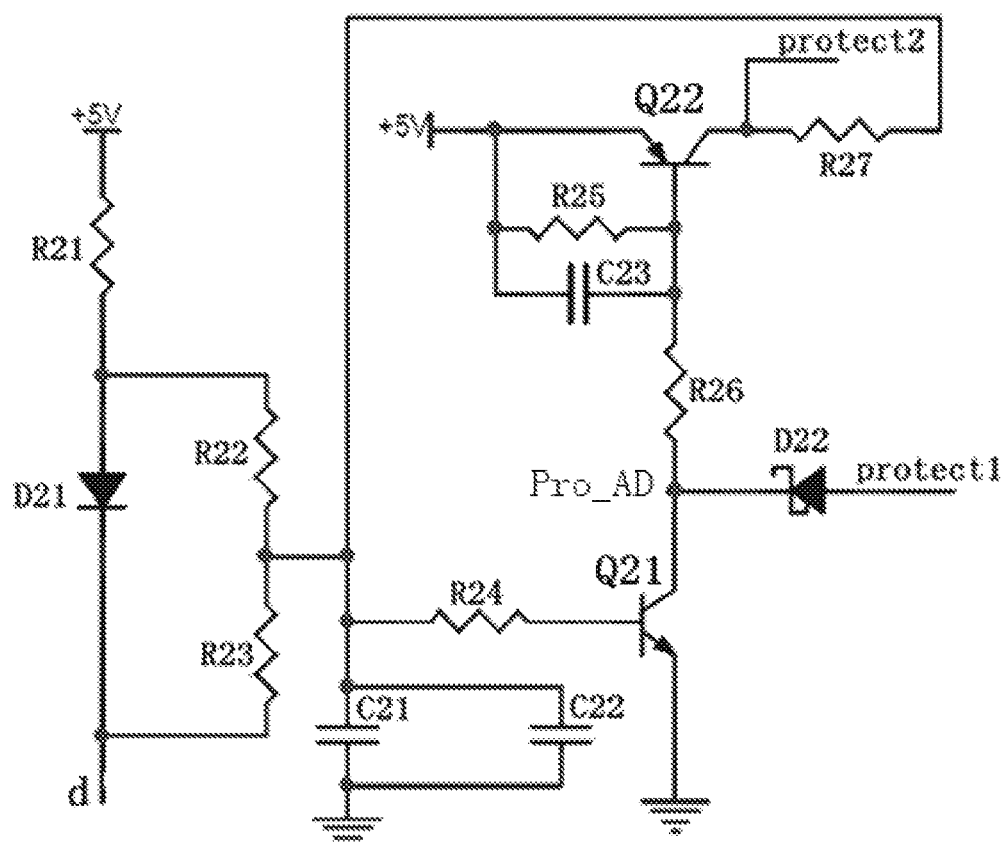
FIG. 11 is a circuit diagram of a first brake protection circuit in a control circuit.

In one example, the first brake protection circuit 184 in FIG. 9 may employ a circuit structure illustrated in FIG. 11. The first brake protection circuit 184 includes a triode Q21 and a triode Q22. A first terminal of a resistor R21 is connected to a positive electrode of a diode D21, and another terminal of the resistor R21 is connected to +5V direct current power source. The diode D21 and a series branch formed by a resistor R22 and a resistor R23 are connected in parallel. The positive electrode of the diode D21 is connected to a first terminal of the resistor R22, and a negative electrode of the diode D21 is respectively connected to a second terminal of the resistor R23 and the second voltage detecting unit 190 (the node d). A second terminal of the resistor R22 is connected to a first terminal of the resistor R23, on the other hand, is grounded through a parallel branch formed by a capacitor C21 and a capacitor C22. The triode Q21 is a NPN-type triode. A base of the triode Q21 is connected to the second terminal of the resistor R22 through a resistor R24, an emitter of the triode Q21 is grounded, a collector of the triode Q21 is connected to a negative electrode of a Schottky diode D22. A positive electrode of the voltage-regulator diode D22 (a terminal protect1) is connected to the brake driving circuit 183. A triode Q22 is a PNP-type triode. A base of the triode Q22 is connected to the collector of the triode Q21 through a resistor R26, on the other hand, is connected to an emitter of the triode Q22 through a parallel circuit formed by a resistor R25 and a capacitor C23. A collector of the triode Q22 is connected to the second terminal of the resistor R22 through a resistor R27, on the other hand, is connected to the second brake protection circuit 185.

In the braking state, when the current in the braking branch is relatively small, the voltage at the second terminal of the braking switch 163 is relatively low, and the voltage U2 outputted to the first brake protection circuit 184 by the second voltage detecting unit 190 is relatively low. The triode Q21 is turned on, and the terminal protect1 outputs the high level signal to the brake driving circuit 183. The triode Q22 is turned off, and the terminal protect 2 outputs the low level signal to the second brake protection circuit. When the current in the braking branch is relatively large, the voltage U2 at the second terminal of the braking switch 163 is relatively high, and the voltage outputted to the first brake protection circuit 184 by the second voltage detecting unit 190 is relatively high. The triode Q21 is turned on, and the terminal protect1 outputs a low level signal to the brake driving circuit 183. The triode Q22 is turned on, and the terminal protect2 outputs the high level signal to the second brake protection circuit 185. After the triode Q22 is turned on, a voltage of the second terminal of the resistor R22 connected to the resistor R27 on the collector of the triode Q22 is the high level. At this moment, regardless of whether the voltage at the node d is the high level or low level, the triode Q21 can remain turned on, realizing the self-locking function.

Figure 12:
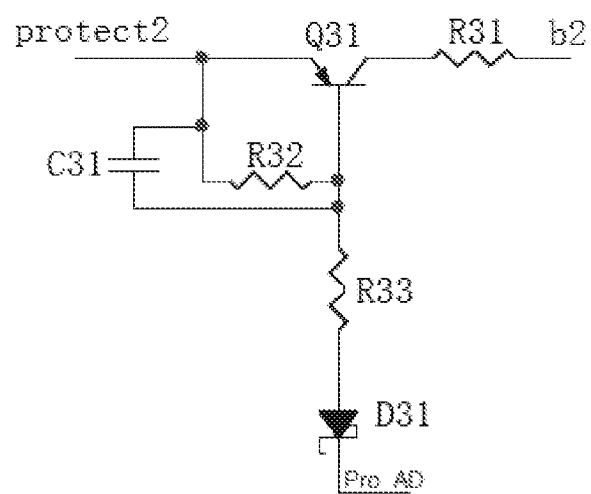
FIG. 12 is a circuit diagram of a second brake protection circuit in a control circuit.

In one example, the second brake protection circuit 185 in FIG. 9 may employ a circuit structure as illustrated in FIG. 12. The second brake protection circuit 185 includes a PNP-type triode Q31. A collector of the triode Q31 is connected to the driving switch 152 (corresponding to a node b2) through a resistor R31. A base of the triode Q31 is connected to the collector of the triode (corresponding to a node Pro_AD) through a resistor R33 and a Schottky diode D31. An emitter of the triode Q31 is connected to the base of the triode Q31 through a parallel circuit formed by a resistor R32 and a capacitor C31, on the other hand, is connected to the collector of the triode Q22 (corresponding to the node protect 2).

When the first brake protection circuit 184 outputs the low level signal to the second brake protection circuit 185, the node Pro_AD is the low level signal, the triode Q31 is turned off, the node b2 outputs the low level signal controlling the driving switch 152 to be opened. When the first brake protection circuit 184 outputs the high level signal to the second brake protection circuit 185, the node Pro_AD is the high level signal, the triode Q31 is turned on, and the node b2 outputs the high level signal controlling the driving switch 152 to be closed.

Figure 13:
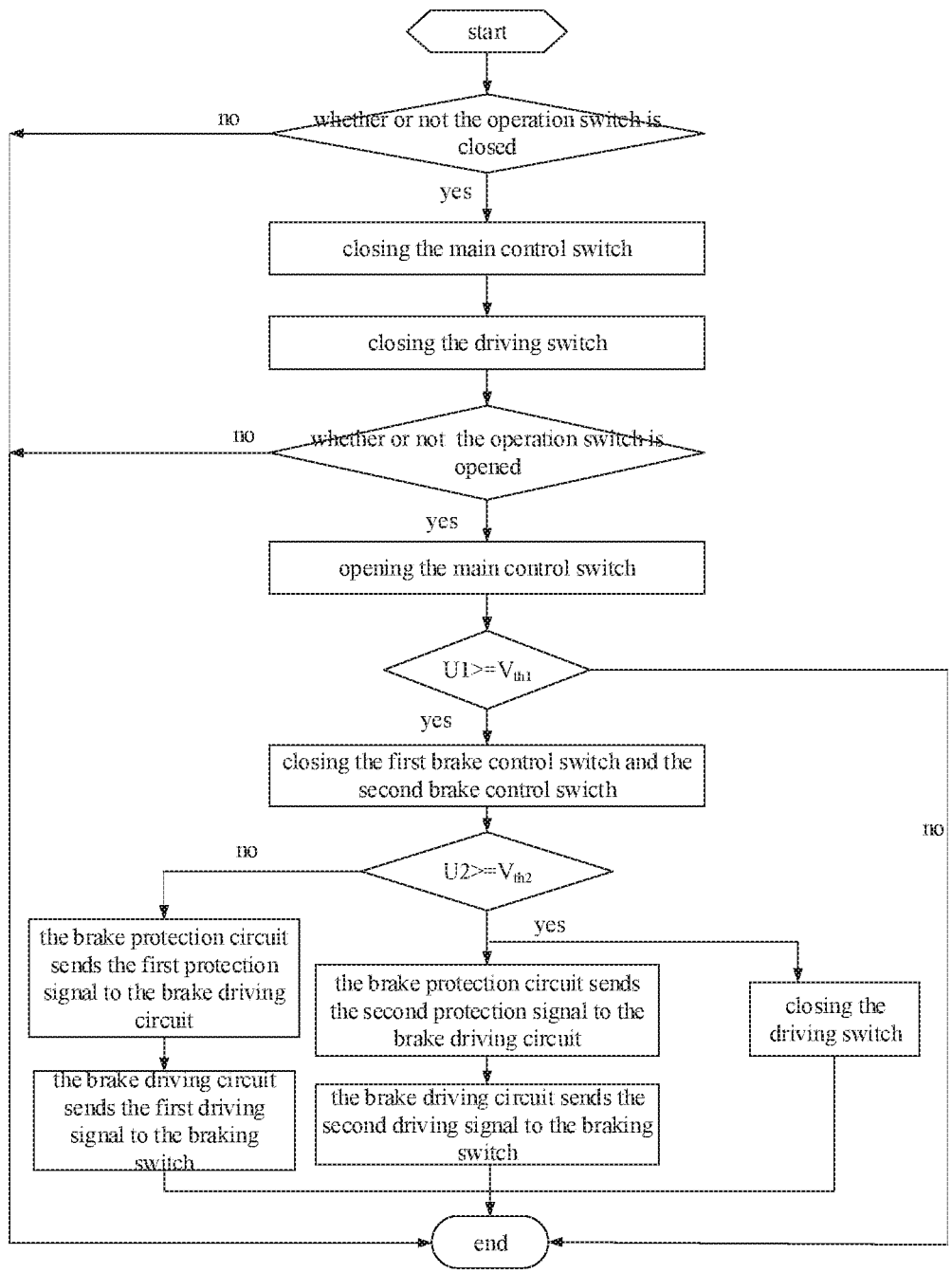
FIG. 13 is a control flow chart of the control circuit of FIG. 8.

Taking FIG. 13 as an example, the controlling process of the above control circuit for a motor is further explained. A first voltage threshold Vth1 and a second voltage threshold Vth2 are set. In the driving state, when U1>=Vth1, the braking switch 163 is considered to be not short-circuited, otherwise, the braking switch 163 is considered to be short-circuited, and the braking branch in the braking state is turned off after the operating switch is turned off. In the braking state, when U2>=Vth2, the braking current in the braking branch is considered to be too large, and measures should be taken to decrease the braking current. At the same time, for convenience of description, it is prescribed that all switches is closed when receiving the high level voltage and opened when receiving the low level voltage. Referring to FIG. 9 and FIG. 10, when the operating switch arranged on the housing of the power tool is closed, the central processing unit 181 detects that the operating switch is switched to the closed state from the open state, the brake control switches 161 and 162 of the brake control switch group and the braking switch 163 is opened, the main control switch 151 is closed, and the circuit switch enters the driving state. The driving switch 152 is closed, at this moment, the driving branch is closed, and the braking branch is closed. The first voltage detecting unit 182 detects the voltage at the first terminal of the braking switch 163, and sends the detecting results to the central processing unit 181 to perform the threshold determination. When U1>=Vth1, the braking switch 163 is considered to be normal. When the operating switch arranged on the external of the power tool is opened by the user, the central processing unit 181 detects that the operating switch is switched to the open state from the closed state, the main control switch 151 and the driving switch 152 are opened, and the brake control switches 161 and 162 are closed. The central processing unit 181 sends the pulse signal (the periodic high and low level signals) to the brake driving circuit 183, and the second voltage detecting unit 190 detects the voltage U2 at the braking switch 163 and sends to first brake protection circuit 184. When U2<Vth2, the first brake protection circuit 184 sends the first protection signal to the brake driving circuit 183, and the first protection signal is the high level signal. The brake driving circuit 183 generates the first driving signal, namely the pulse signal controlling the braking switch 163 to be periodically closed and opened, by combining the pulse signal and the first protection signal. When U2>=Vth2, the first brake protection circuit 184 sends the second protection signal to the brake driving circuit 183, and the second protection signal is the low level signal. The brake driving circuit 183 generates the second driving signal, namely the low level signal controlling the braking switch 163 to be opened, by combing the pulse signal and the second protection signal. At the same time, the first brake protection circuit 184 sends the third protection signal to the second brake protection circuit 185, and the third protection signal is the high level signal. The second brake protection circuit 185 generates the fourth protection signal, namely the high level signal controlling the driving switch 152 to be closed, according to the third protection signal for a secondary protection.

In another example, in the control circuit adapted to the motor, the second brake protection circuit 185 is electrically connected to the first brake control switch 1161 and/or the second brake control switch 162. When the first brake protection circuit 184 outputs the first protection signal to the braking switch 163, the first brake protection circuit 184 outputs the third protection signal to the second brake protection circuit 185 at the same time. The second brake protection circuit 185 generates a fifth protection signal according to the third protection signal, and the fifth protection signal is a signal controlling the second brake protection circuit 185, and the first brake control switch 161 and/or the second brake control switch 162 to be opened. The braking branch is unable to remain conductive after the first brake control switch 161 and/or the second brake control switch 162 is opened, thereby reducing the braking current.

In another example, the control over the braking current can also be realized in a combination manner that the first brake control switch 161 and/or the second brake control switch 162 is opened and the driving switch 152 is closed.

In one example, when the motor is in the braking state, the stator winding and the rotor in the driving branch are disconnected. If it is detected that the braking branch is short-circuited, or braking parameters in the braking state or during the braking process exceed predetermined values, or a braking force generated by the braking branch exceed a predetermined value during a certain period of time, the braking branch is cut off, and the connection between the stator winding and rotor in the driving branch is turned on. The driving force generated by the driving branch can counteract the braking force generated by the braking branch. Since the braking branch is cut off at this moment, the braking force generated by the braking branch is zero.

In another example, when the motor is in the braking state, the connection between the stator winding and the rotor in the driving branch is turned on. If the braking branch is detected as short-circuited, or the braking parameters in the braking state or during the braking process exceed the predetermined values, or the braking force generated by the braking branch exceed the predetermined value during a certain period of time, the braking branch is not cut off, and the driving force generated by the connection and conduction of the stator and rotor in the driving branch can counteract the braking force generated by the braking branch.

In summary, provided is a control circuit adapted to the motor. The motor includes the stator winding and the rotor. The control circuit includes the driving branch and the braking branch, and has the driving state and the braking state. In the braking state, if it is detected that the braking parameters of the braking branch exceed the predetermined value, the driving branch is closed, the driving force generated by the conduction of the driving branch is used to resist or counteract the braking force or braking force generated by the braking branch. It should be noted that the conduction of the driving branch may be a continuous conduction, or a partial conduction of the driving circuit. In one example, the partial conduction of the driving circuit can be realized by adjusting the duty ratio.

In another example, the driving branch includes the branch formed by the stator winding and the rotor. When it is detected that the braking parameters in the braking state or during the braking process exceed the predetermined value or the braking force generated by the braking branch exceeds the predetermined value, the connection between the stator winding and rotor in the driving branch is turned on, and the driving force generated by the conduction and connection of the stator winding and rotor in the driving branch is used to resist or counteract the braking force or braking force generated by the braking branch.

Figure 14:
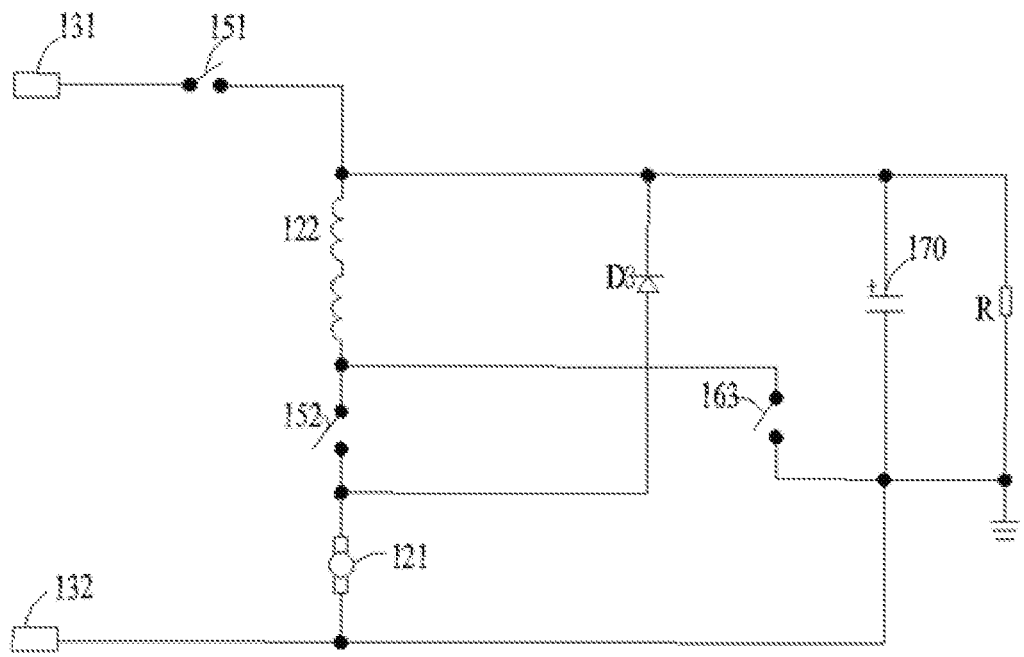
FIG. 14 is a fourth circuit diagram of a control circuit for a motor
Figure 15:
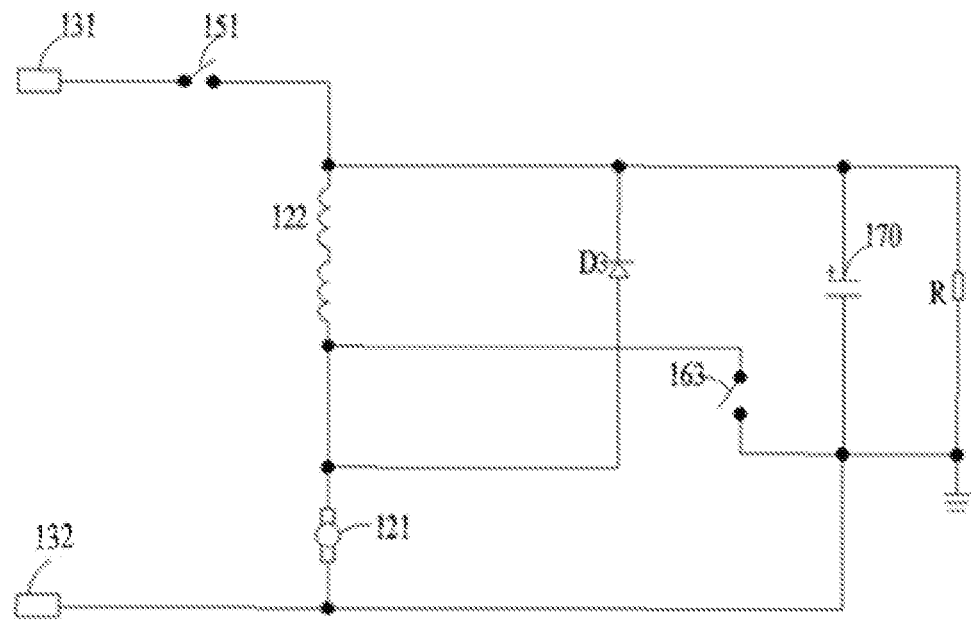
FIG. 15 is a fifth circuit diagram of a control circuit for a motor.
Figure 16:
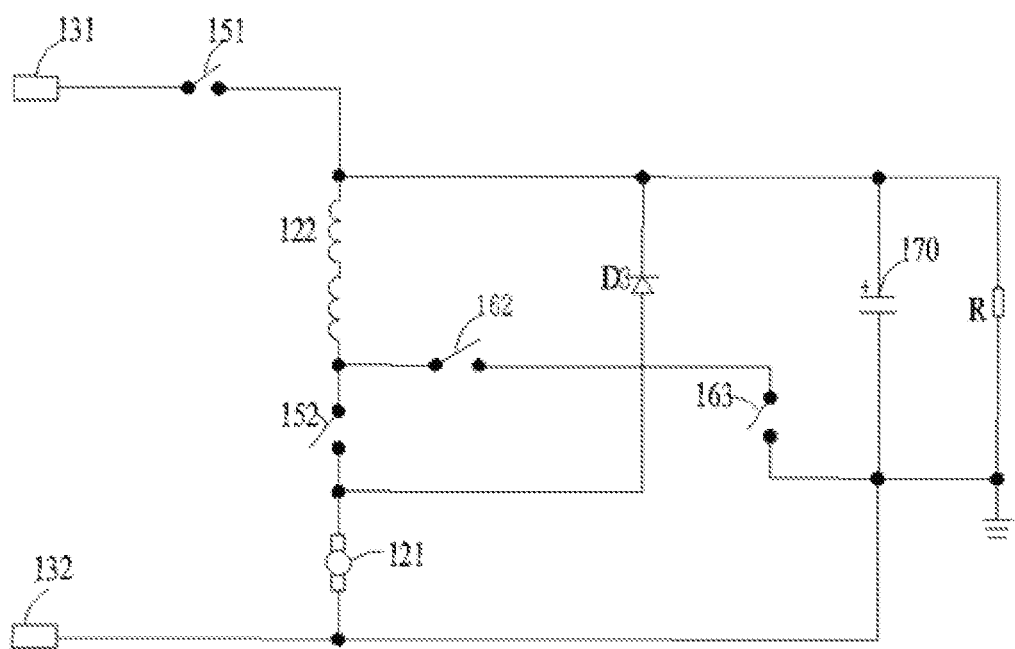
FIG. 16 is a sixth circuit diagram of a control circuit for a motor.

The following is specifically illustrated by FIGS. 14 to 16.

The main difference between the control circuit as illustrated in FIG. 14 and the control circuits illustrated in FIG. 7 and FIG. 8 is that the braking branch in FIG. 14 only includes the braking switch 163. The control method for the conduction and cutoff and the detecting method for the short circuit fault of the braking switch 163 in the above examples are all applicable to the preset example. The control circuit includes the driving branch and the braking branch. The driving branch includes the branch formed by the connection in series of the stator winding 122, the driving switch 152 and the rotor 121. The driving branch in the driving state is connected to the external power source, and the driving branch in the braking state is cut off with the external power source. The braking branch includes the branch formed by the stator winding 122, the braking switch 163 and the electrical energy storage component 170 that are connected in series. The electrical energy storage component 170 is used to provide the electrical energy to the braking branch. The electrical energy storage component 170 is connected between two terminals of the rotor 121 through the diode D3. In the driving state, the connection of stator winding 121 and the rotor 122 is turned on by the driving switch 152, so that the stator winding 122 generates the first driving force driving the rotor 121 to rotate. In the normal braking state, the connection of the stator winding 122 and the rotor 121 is cut off by the driving switch 152, the braking branch is closed, and the stator winding 122 provides the braking force preventing the rotation of the rotor 121 to the rotor 121. If the short circuit fault occurs on the braking switch 163, the driving switch 152 is closed to turn on the connection of the stator winding 122 and the rotor 121, so that the stator winding 122 again generates the second driving force driving the rotor 121 to rotate, to counteract a part of the braking force generated by the braking branch. In other words, in the braking state, the stator winding and the rotor in the driving branch are disconnected. If it is detected that the braking branch is short-circuited during a certain period of time, the braking branch cannot be cut off, the connection between the stator winding and the rotor in the driving branch is turned on, and the driving force generated by the driving branch can counteract the braking force generated by the braking branch. The functions of the other elements in the control circuit in the above examples are applicable to the present example, and are not described herein.

In one example, the stator winding and the rotor remain connected when the control circuit is in the braking state and the driving state. As illustrated in FIG. 15, the driving switch 152 in the driving branch is removed. In the same way, the control method for the conduction and cutoff and the detecting method for the short circuit fault of the braking switch 163 in the above examples are all applicable to the preset example, and the functions of the other elements in the control circuit in the above examples are also applicable to the present example. The control circuit includes the driving branch and braking branch. The driving branch includes a branch formed by the stator winding 122 and the rotor 121 which are connected in series. The driving branch in the driving state is closed with the external power source, and the driving branch in the braking state is cut off with the external power source. The braking branch includes the branch formed by the stator winding 122, the braking switch 163 and the electrical energy storage component 170 that are connected in series. The electrical energy storage component 170 is used to provide the electrical energy to the braking branch, and connected between two terminals of the rotor 121 through the diode D3. In the driving state, the stator winding 122 generates the first driving force driving the rotor 121 to rotate. In the normal braking state, the braking branch is closed, and the stator rotor 122 generates the braking force preventing the rotor 122 from rotating. At the same time, the stator winding 122 generates the second driving force driving the rotor 121 to rotor, to resist or counteract a part of the braking force. In other words, in the braking state, the stator winding and the rotor in the driving branch are connected. If it is detected that the braking branch is short-circuited during a certain period of time, the braking branch cannot be cut off, and the driving force generated by connection of the stator winding and the rotor in the driving branch can counteract the braking force generated by the braking branch. The functions of the other elements in the control circuit in the above examples are applicable to the present example, and are not described herein.

It should be noted that the driving force generated by the driving branch in the braking state or during the braking process, in the above examples, is employed to resist or counteract the braking force or braking force generated by the braking branch. In other examples, a positive force generated by an independent anti-braking loop or circuit in the braking state or during the braking process is employed to resist or counteract a braking opposite force generated by the braking branch.

The main difference between the control circuit as illustrated in FIG. 16 and the control circuits in FIG. 7 and FIG. 8 is that the braking branch in FIG. 16 also adds the second brake control switch 152 on a basis of FIG. 14. In the same way, the control method for the conduction and cutoff and the detecting method for the short circuit fault of the braking switch 163 in the above examples are all applicable to the preset example, and the functions of the other elements in the control circuit in the above examples are also applicable to the present example. The control circuit includes a driving branch and a braking branch. The driving branch includes the branch formed by the stator winding 122, the driving switch 152 and the rotor 121 which are connected in series. The driving branch in the driving state is connected the external power source, and the driving branch in the braking state is cut off with the external power source. The braking branch includes the branch formed by the stator winding 122, the second brake control switch 162, the braking switch 163 and the electrical energy storage component 170 that are connected in series. The electrical energy storage component 170 is used to provide the electrical energy to the braking branch, and connected between the two terminals of the rotor 121 through the diode D3. In the driving state, the connection of the stator winding 122 and the rotor 121 is turned on by the driving switch 152, so that the stator winding 122 generates the driving force driving the rotor 121 to rotate. In the normal braking state, the connection of the stator winding 122 and the rotor 121 is cut off by the driving switch 152, the second brake control switch 162 and the braking switch 163 are both turned on, the braking branch is closed, and the stator winding 121 provides the braking force preventing the rotation of the rotor 121 to the rotor 121. If the short circuit fault occurs on the braking switch 163, the second brake control switch 162 is opened to cut off the conduction of the braking branch, avoiding the damage caused by the too large braking current. In other words, when the motor is in the braking state, the stator winding and the rotor in the driving branch are disconnected. If it is detected that the braking branch is short-circuited during a certain period of time, the braking branch is cut off. In another example, the braking branch may also only add a first brake control switch 161, the controlling method of the first brake control switch 161 is the same as that of the second brake control switch 162. In another example, when the short circuit fault occurs on the braking switch 163, the second brake control switch 162 is opened, and the driving switch 150 is closed. In other words, when the motor is in the braking state, the stator winding and the rotor in the driving branch are disconnected. If it is detected that the braking branch is short-circuited, the braking branch is cut off, and the connection of the stator winding and the rotor in the driving branch is turned on. The functions of the other elements in the control circuit in the above examples are applicable to the present example, and are not described herein.

The above illustrates and describes basic principles, main features and advantages of the present disclosure. Those skilled in the art should appreciate that the above examples do not limit the present disclosure in any form. Technical solutions obtained by equivalent substitution or equivalent variations all fall within the scope of the present disclosure.

What is claimed is:

1. A control circuit for a motor including a stator winding and a rotor, the control circuit having a driving state and a braking state and comprising:
   a main control switch, wherein the control circuit enters the driving state in response to the main control switch being closed and enters the braking state in response to the main control switch being opened;
   a driving branch, comprising a first branch formed by the stator winding, a driving switch, and the rotor, wherein the driving branch is configured to control a connection between the stator winding and the rotor to be turned on or off;
   a braking branch, comprising a second branch formed by the stator winding, a braking switch, and an electrical energy storage component, wherein the electrical energy storage component is configured to provide an electrical energy to the braking branch and is arranged between two terminals of the rotor; and
   a control unit, electrically connected to the main control switch, to the driving switch, and to the braking switch, separately, configured to control the main control switch, the driving switch, and the braking switch to be closed or opened,
   wherein the connection between the stator winding and the rotor of the driving branch is turned on in response to detecting that, in the braking state, a braking parameter of the braking branch exceeds a predetermined value, and
   wherein the braking branch is further provided with a current detecting unit configured to detect, under the braking state, whether a braking current in the braking branch exceeds a preset threshold and the control circuit is configured to control the braking switch to stay in an open state in response to the current detecting unit detecting that the braking current in the braking branch exceeds the preset threshold to cut off a connection between the electrical energy storage component and the stator winding.

2. The control circuit according to claim 1, wherein a diode is connected in series between the electrical energy storage component and the rotor to allow the electrical energy storage component to be unidirectional charged or discharged.

3. The control circuit according to claim 1, wherein the driving switch is connected in series between the stator winding and the rotor and is configured to control the connection between the stator winding and the rotor to be turned on or off.

4. The control circuit according to claim 1, wherein the control unit comprises a brake driving circuit configured to send a pulse signal to the braking switch in the driving state to control the braking switch to be closed or opened.

5. The control circuit according to claim 1, wherein the control circuit is configured to control the driving switch to be closed in response to the braking current in the braking branch exceeding a preset threshold to allow a current between the stator winding and the rotor to be turned on.

6. The control circuit according to claim 1, wherein the braking branch further comprises a first brake control switch and a second brake control switch and, from one terminal to another terminal of the stator winding, the braking branch comprises the first brake control switch, the electrical energy storage component, the braking switch, and the second brake control switch sequentially connected in series.

7. The control circuit according to claim 6, comprising a voltage detecting unit configured to detect, under the driving state, whether the braking switch is short-circuited and the control circuit is configured to control the first brake control switch and the second brake control switch in response to the voltage detecting unit detecting that the braking switch is short-circuited to make the braking branch not closed in the braking state.

8. The control circuit according to claim 6, wherein, in response to a braking current in the braking branch exceeding a preset threshold under the braking state, the control circuit is configured to control the first brake control switch and/or the second brake control switch to be opened.

9. The control circuit according to claim 6, wherein the control unit comprises a first voltage detecting unit, a brake driving circuit, a first brake protection circuit, a second brake protection circuit, and a central processing unit and the braking branch is further provided with a second voltage detecting unit, the first voltage detecting unit is configured to detect, under the driving state, a first voltage at a junction of the braking switch and the second brake control switch and send the first voltage to the central processing unit, the second voltage detecting unit is arranged between the braking switch and the electrical energy storage component and is configured to send a second voltage to the first brake protection circuit, the central processing unit is configured to determine whether the braking switch is short-circuited based on the first voltage and further control whether to turn on the braking branch under the braking state, the central processing unit is configured to send, under the braking state, a pulse signal to the brake driving circuit, the first brake protection circuit is configured to output a first protection signal or a second protection signal to the brake driving circuit based on the second voltage, the first brake protection circuit is configured to output a third protection signal to the second brake protection circuit in response to the first brake protection circuit outputting first protection signal to the brake driving circuit, the brake driving circuit is configured to generate a first driving signal based on the pulse signal and the first protection signal and the first driving signal is a signal that controls the braking switch to be periodically closed, the brake driving circuit is configured to generate a second driving signal based on the pulse signal and the second protection signal and the second driving signal is a signal that controls the braking switch to be opened, and the second brake protection circuit is configured to generate a fourth protection signal based on the third protection signal and the fourth protection signal is a signal that controls the driving switch to be closed.

10. The control circuit according to claim 1, wherein, in response to detecting, under the braking state, that a braking force generated by the braking branch exceeds a predetermined value, the connection between the stator winding and the rotor of the driving branch is turned on.

11. A control circuit for a motor including a stator winding and a rotor, the control circuit comprising:
a driving branch; and
a braking branch;
wherein the control circuit has a driving state and a braking state, the driving branch comprises a first branch formed by the stator winding and the rotor, the braking branch comprises a second branch formed by the stator winding, a braking switch, and an electrical energy storage component, the electrical energy storage component is configured to provide an electrical energy to the braking branch, and a connection between the stator winding and the rotor of the driving branch is turned on in response to detecting, under the braking state, that a braking parameter of the braking branch exceeds a predetermined value, and
wherein, under the braking state, the stator winding and the rotor of the driving branch are disconnected and, in response to detecting that the braking branch is short-circuited, the braking branch is cut off and the connection between the stator winding and the rotor is turned on.

12. The control circuit according to claim 11, wherein a driving switch is arranged between the stator winding and the rotor and, in response to the braking switch being short-circuited under the braking state, the driving switch is configured to be closed to turn on the connection between the stator winding and the rotor.

13. The control circuit according to claim 11, wherein the connection between the stator winding and the rotor of the motor is turned on both under the driving state and under the braking state.

14. The control circuit according to claim 11, wherein the braking branch is further provided with at least one brake control switch and, in response to the braking switch being short-circuited, at least one of the at least one brake control switch is configured to be opened to cut off the braking branch.

15. The control circuit according to claim 11, wherein a diode is connected in series between the electrical energy storage component and the rotor to allow the electrical energy storage component to be unidirectionally charged or discharged.

16. A power tool, comprising:
a housing;
an operating switch arranged on the housing;
a working part arranged on the housing;
a motor configured for driving the working part and arranged inside the housing, the motor having a stator winding and a rotor; and
a control circuit for controlling the motor comprising a driving branch having a driving state and a braking branch having a braking state wherein, in response to detecting, under the braking state, that a braking parameter of the braking branch exceeds a predetermined value, the driving branch is turned on, and
wherein the braking branch is further provided with a current detecting unit configured to detect, under the braking state, whether a braking current in the braking branch exceeds a preset threshold and the control circuit is configured to control a braking switch to stay in an open state in response to the current detecting unit detecting that the braking current in the braking branch exceeds the preset threshold to cut off a connection between an electrical energy storage component and the stator winding.

17. The power tool of claim 16, wherein the driving branch comprises a branch formed by the stator winding and the rotor and, in response to detecting, under the braking state, that a braking force generated by the braking branch exceeds the predetermined value, the connection between the stator winding and the rotor of the driving branch is turned on.

18. The power tool of claim 16, wherein, under the braking state, the stator winding and the rotor of the driving branch are disconnected and, in response to detecting that the braking branch is short-circuited, the braking branch is cut off and the connection between the stator winding and the rotor is turned on.

* * * * *

UNITED STATES PATENT AND TRADEMARK OFFICE
CERTIFICATE OF CORRECTION

PATENT NO. : 10,892,691 B2  
APPLICATION NO. : 16/533079  
DATED : January 12, 2021  
INVENTOR(S) : Junya Duan et al.

Page 1 of 1

It is certified that error appears in the above-identified patent and that said Letters Patent is hereby corrected as shown below:

On the Title Page

Below Item (65) add:  
Related U.S. Application Data  
(63) Continuation of application No. PCT/CN2018/076730, filed February 13, 2018.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*